(12) United States Patent
Bhattacharya (10) Patent No.: US 9,390,085 B2
(45) Date of Patent: Jul. 12, 2016

(54) SPEECH PROCESSING SYSTEM AND METHOD FOR RECOGNIZING SPEECH SAMPLES FROM A SPEAKER WITH AN ORIYAN ACCENT WHEN SPEAKING ENGLISH

(71) Applicant: TATA CONSULTANCY SERVICES LIMITED, Mumbai (IN)

(72) Inventor: Suman Bhattacharya, Bhubaneswar (IN)

(73) Assignee: TATA CONSULTANCY SEVICES LIMITED, Mumbai (IN)

( * ) Notice: Subject to any disclaimer, the term of this patent is extended or adjusted under 35 U.S.C. 154(b) by 390 days.

(21) Appl. No.: 13/799,822

(22) Filed: Mar. 13, 2013

(65) Prior Publication Data
US 2013/0253909 A1 Sep. 26, 2013

(30) Foreign Application Priority Data
Mar. 23, 2012 (IN) .......................... 785/MUM/2012

(51) Int. Cl.
*G06F 17/28* (2006.01)
*G10L 25/51* (2013.01)
(Continued)

(52) U.S. Cl.
CPC ................ *G06F 17/28* (2013.01); *G10L 17/26* (2013.01); *G10L 25/51* (2013.01); *G10L 13/033* (2013.01); *G10L 15/005* (2013.01); *G10L 15/065* (2013.01); *G10L 25/15* (2013.01)

(58) Field of Classification Search
USPC ................................................ 704/9, 10, 257
See application file for complete search history.

(56) References Cited

U.S. PATENT DOCUMENTS 4,473,904 A * 9/1984 Suehiro ............... G10L 19/0018
704/207
5,999,895 A * 12/1999 Forest ................... G06F 3/0236
382/185

(Continued)

FOREIGN PATENT DOCUMENTS

IN WO 2010072552 A1 * 7/2010 .............. C01B 33/44

OTHER PUBLICATIONS

Suphattharachai Chomphan, Fujisaki's Model of Fundamental Frequency Contours for Thai Dialects, Journal of Computer Science 6 (11): 1263-1271, 2010, ISSN 1549-3636.*

(Continued)

*Primary Examiner* — Tammy Pham
*Assistant Examiner* — Walter Yehl
(74) *Attorney, Agent, or Firm* — Seed IP Law Group PLLC (57) ABSTRACT

Method(s) and system(s) for speech processing of second language speech are described. According to the present subject matter, the system(s) implement the described method(s) for speech processing of Oriya English. The method for speech processing include receiving a plurality of speech samples of Oriya English to form a speech corpora where the plurality of speech samples comprise sounds of both vowels and consonants and, a plurality of speech parameters are associated with each of the plurality of speech samples. Method also includes determining values of the plurality of speech parameters for each of the plurality of speech samples and identifying difference between the values of each of the plurality of speech parameters and a corresponding value of accent neutral English. Further, the method includes articulating governing language rules based on the identifying to assess phonetic variation and mother tongue influence in sounds of vowels and consonants of Oriya English.

15 Claims, 3 Drawing Sheets

(51) Int. Cl.
   *G10L 17/26* (2013.01)
   *G10L 15/00* (2013.01)
   *G10L 15/065* (2013.01)
   *G10L 25/15* (2013.01)
   *G10L 13/033* (2013.01)

(56) References Cited

U.S. PATENT DOCUMENTS

| | | | | |
|---|---|---|---|---|
| 6,078,884 | A * | 6/2000 | Downey | G10L 25/87 704/243 |
| 6,085,160 | A | 7/2000 | D'hoore et al. | |
| 6,278,970 | B1 * | 8/2001 | Milner | G10L 15/02 704/203 |
| 6,832,191 | B1 * | 12/2004 | Frasca | G10L 15/063 704/240 |
| 7,113,908 | B2 * | 9/2006 | Goronzy | G10L 15/07 704/244 |
| 7,315,811 | B2 * | 1/2008 | Cote | G10L 15/183 704/10 |
| 7,502,739 | B2 | 3/2009 | Saito et al. | |
| 7,912,721 | B2 * | 3/2011 | Dow | G10L 15/005 704/251 |
| 7,962,345 | B2 | 6/2011 | Liqin et al. | |
| 8,712,773 | B2 * | 4/2014 | Zheng | G10L 15/187 434/185 |
| 2002/0095282 | A1 * | 7/2002 | Goronzy | G10L 15/065 704/10 |
| 2002/0133340 | A1 * | 9/2002 | Basson | G10L 15/22 704/235 |
| 2002/0143531 | A1 * | 10/2002 | Kahn | G10L 15/26 704/235 |
| 2008/0177543 | A1 * | 7/2008 | Nagano | G10L 15/04 704/253 |
| 2010/0211376 | A1 * | 8/2010 | Chen | G10L 15/187 704/2 |
| 2011/0046958 | A1 * | 2/2011 | Liu | G10L 17/02 704/268 |
| 2011/0077944 | A1 | 3/2011 | Seshadri | |
| 2011/0119051 | A1 * | 5/2011 | Li | G10L 15/065 704/10 |
| 2013/0238337 | A1 * | 9/2013 | Kamai | G10L 25/15 704/258 |

OTHER PUBLICATIONS aDict, Akshar Speech Technologies (P) Ltd., http://www.aksharspeech.com/aDict.html, 1 page.

* cited by examiner

SPEECH PROCESSING SYSTEM AND METHOD FOR RECOGNIZING SPEECH SAMPLES FROM A SPEAKER WITH AN ORIYAN ACCENT WHEN SPEAKING ENGLISH

TECHNICAL FIELD

The present subject matter relates, in general, to speech processing and, in particular, but not exclusively, to speech processing for second language speech.

BACKGROUND

Speech recognition generally refers to a technique to convert speech in one language into text of same or another language, or speech in one language to speech in another language by using a computer. In other words, speech recognition is to automatically translate one language into another language without the involvement of human labor, and by use of digital processing ability of computers. Speech recognition techniques allow speech-based translation (STT) and text-based translation TTS (text-to-speech) for multiple languages where speech can be transformed into the text of any language and text can be translated into speech of any language.

Since, the accents of different groups of speakers differ due to regional or social status, norms and practices, language accents pronunciation may be influenced. Further, language pronunciation may also be influenced by second language speakers. For example, a person whose first language is Kannada (a South Indian language) may speak Hindi (the national Indian language) with a kannadian accent, or a person whose first language is Hindi may speak English with a Hindi accent.

Generally, English has grown in importance as a language for international communication throughout the world. Particularly, the blend of English with local languages and dialects in different countries has given rise to wide diversity in the manner of pronunciation and accent used of English. Is Asia-pacific region, much of influence can be seen in regions such as Greater China, India, Malaysia and the Philippines thereby exhibiting rich variation in English pronunciation, lexicon and grammar.

Relative to the standard languages such as Hindi and English; and their pronunciation, the non-standardized accents of these languages generally include phonetic variations due to regional and mother tongue influence. Since the phonetic variations in a standard language usually result in low recognition rates for speech recognition systems, a comprehensive understanding of the variations present in the dialects of English spoken across the world today is a concern for the development of spoken language science and speech recognition technology.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

SUMMARY

This summary is provided to introduce concepts related to speech processing of second language speech. This summary is not intended to identify essential features of the claimed subject matter nor is it intended for use in determining or limiting the scope of the claimed subject matter.

In one implementation, method(s) and system(s) for speech processing of second language speech are described. The system(s) may implement the described method(s) for speech processing of Oriya English. The method may include receiving a plurality of speech samples of Oriya English to form a speech corpora where the plurality of speech samples comprise sounds of both vowels and consonants and, a plurality of speech parameters are associated with each of the plurality of speech samples. Method also includes determining values of the plurality of speech parameters for each of the plurality of speech samples and identifying difference between the values of each of the plurality of speech parameters and a corresponding value of accent neutral English. Further, the method includes articulating governing language rules based on the identifying to assess phonetic variation and mother tongue influence in sounds of vowels and consonants of Oriya English.

DETAILED DESCRIPTION

Method(s) and system(s) for speech processing of second language speech are described. For the sake of clarity, speech processing referred hereinafter is to be understood to include speech recognition and speech synthesis. In one implementation, the speech processing for second language is based on the pronunciation variations in the speech due to mother tongue influence (MTI) of a speaker. The methods can be implemented in systems that include, but are not limited to, desktop computers, hand-held devices, laptops or other portable computers, mobile phones, landline phones, and the like. Although the description herein is with reference to certain computing devices, the methods and systems may be implemented in other devices and systems as well, albeit with a few variations, as will be understood by a person skilled in the art.

In India, English is spoken widely and occupies the status of a second language in most of the Indian states. In spite of this there is a great variation in the way it is spoken across India. The inflection of first language sounds and accent largely distorts the basic sounds and other phonetic and phonological features of English. In India itself, a large variety and variations of English is spoken, each affected by the sounds of the mother tongue spoken in the respective regions, also known as Mother Tongue Influence (MTI). Since English is observed as a second language rather than a first language for individuals, neither a standard British English or an American English is spoken across the country.

Further, in India, the English language is taught to the learners in primary, secondary and higher secondary levels and the pedagogy is often constrained for appreciation of the basic sounds of English and the learners thus articulate the same leading to mother tongue influences in the their English speech. Due to such mother tongue inflections, possibility of a standard Indian English could pose a tremendous challenge and, in absentia of any such standard Indian English, automatic speech recognition of Indian spoken language with a standard approach might not be possible. Further, an attempt on speech recognition without any standard Indian English may result in very low recognition rate with increased error and ambiguous determinations.

Oriya is a language spoken in eastern region of India for which any determination of phonetic variations and mother tongue influence on English is almost non-existent. As any other influenced language, Oriya English has many variations when compared with British English or US English due to the mother tongue influence which are different and peculiar to Oriyan accent. Hence, according to an implementation of the present subject matter, methods and systems for an automatic Oriya English speech recognition and synthesis based on Oriya mother tongue influence are described. Since English is a second language for Indian Oriya speaking people, the described methods and systems utilize cross phonetic recognition and synthesis techniques to quantify the sound pronunciation effects between Oriya English and accent neutral British and American English. The described systems, on one hand may accept speech input in the accented Oriyan English language and provide text output, on the other, may accept speech/text input in any language and provide speech output in accented Oriyan English language.

Further, the methods and systems may be implemented in voice user interfaces for IT applications and services which are more and more prevalent for languages like English, and are being increasingly valued for their ease of access, especially in telephony-based applications. Availability of such IT applications with local accented Oriya-English language recognition may allow people in various semi-urban and rural parts of eastern India, such as West Bengal and Orissa to use telephones and Internet to access a wide range of services and information on health, agriculture, travel, etc.

In operation, according to an implementation of the present subject matter, phonetic variation, accent, and prosody between Oriya English and accent neutral British English or US English is determined. To determine such fluctuations for the entire Oriya English speech, an Oriyan English speech corpus is developed. The data may be collected from various sources to make the speech corpus more effective, such as the Oriya English speech sounds of both vowels and consonants are explored and analyzed by taking large samples from different parts of Indian State Orissa including all demographic categories. The developed speech corpus may therefore allow articulation of governing language rules for identification of accented vowels and consonant pronunciation.

In one implementation, the governing rules may be implemented based on pre-defined speech parameters, referred to as speech parameters hereinafter, for Oriyan English language. Based on the speech parameters and associated governing rules, speech to text conversion and speech synthesis may be enabled. For speech to text conversion, the language rules may allow isolated word recognition and connected word identification enabling read speech and spontaneous speech determinations. Similarly, to effectively implement speech synthesis for Oriyan English, a non-restrictive vocabulary from the speech corpora is made available that permits synthesis of speech similar to natural speech. In implementation, a sentence is normally converted to a sequence of basic units and then, speech parameters and governing rules of synthesis are employed to produce speech with the incorporation of prosody and intonation.

For the purpose of speech to text conversion and speech synthesis, the speech corpora developed may be analyzed based on speech parameters. Parameters derived for Oriya influenced English speech taken from the English spoken by local people with MTI effect and accent neutral British/US English may then be compared. The comparison may be done with the existing neutral English speech parameters.

In one implementation, the speech parameters may include different excitation parameters and spectral parameters of the Oriyan English in comparison to accent neutral British/US English. In said implementation, Fuzisaki model may be used to derive the parameters like speaker's individual base frequency, a phrase component and an accent component. It would be appreciated by those skilled in the art that different speech sample consists of all these parameters at different context which may be determined for the speech corpora and stored for speech to text conversion and speech synthesis.

For example, speech samples of a word "WATER" uttered by a British male person and uttered by an Odia male person may be analyzed based on waveform, spectrogram, pitch, intensity and Mel Frequency Cepstral coefficient (MFCC) of the sample. The two speech samples may also be analyzed by comparing their $F_0$ contour or Formant contour, extracted by the Fuzisaki Model technique based on the determination of speech parameters. In one implementation, based on the identified speech parameters for the developed speech corpora, speech recognition may be carried through different algorithms of the Hidden Markov Model (HMM).

Hence, based on the analysis of the speech parameters and HMM, the variation in the speech of an Oriyan English from an accent neutral British/US English may be determined for the developed speech corpora enabling speech recognition for Oriyan English. Similarly, the deduction of the parameters also allows speech synthesis where the accent associated with the Oriyan English can be induced in an accent neutral speech generated by automated speech generation systems thereby incorporating prosody in the output speech.

The described methods of speech processing for second language speech describes the method of speech to text conversion and speech synthesis for Oriyan English which can be utilized in many IT applications like security, voiced based BPO etc.

It should be noted that the description merely illustrates the principles of the present subject matter. It will thus be appreciated that those skilled in the art will be able to devise various arrangements that, although not explicitly described herein, embody the principles of the present subject matter and are included within its spirit and scope. Furthermore, all examples recited herein are principally intended expressly to be only for pedagogical purposes to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

It will also be appreciated by those skilled in the art that the words during, while, and when as used herein are not exact terms that mean an action takes place instantly upon an initiating action but that there may be some small but reasonable delay, such as a propagation delay, between the initial action and the reaction that is initiated by the initial action. Additionally, the word "connected" is used throughout for clarity of the description and can include either a direct connection or an indirect connection.

While aspects of described systems and methods for speech processing can be implemented in any number of different computing devices, environments, and/or configurations, the embodiments are described in the context of the following exemplary system(s).

Figure 1:
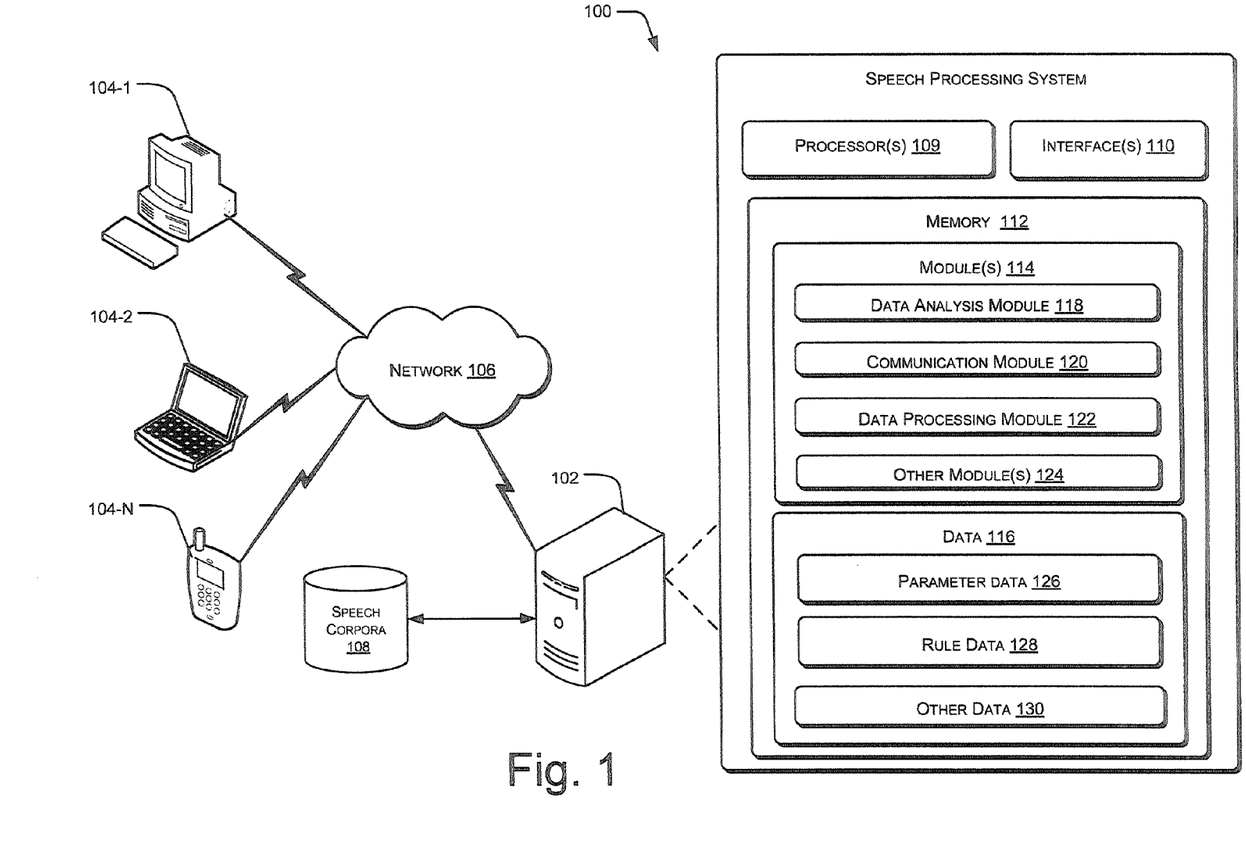
FIG. 1 illustrates a speech processing system, in accordance with an embodiment of the present subject matter.

FIG. 1 illustrates a network environment 100 implementing a speech processing system 102, hereinafter referred to as system 102, in accordance with an embodiment of the present subject matter. In one implementation, the network environment 100 can be a public network environment, including a large number of personal computers, laptops, mobile phones, recorders, various servers, and other computing and communicating devices. In another implementation, the network environment 100 can be a private network environment with a limited number of personal computers, servers, laptops, mobile phones, and other computing devices. In yet another implementation, the environment 100 may be a combination of a private and a public network.

The system 102 may be communicatively connected to a plurality of user devices 104-1, 104-2, ... 104-N, collectively referred to as the user devices 104 and individually referred to as a user device 104, through a network 106. The system 102 and the user devices 104 may be implemented as any of a variety of conventional computing devices, including, servers, a desktop personal computer, a notebook or portable computer, a workstation, a mainframe computer, a mobile computing device, and a laptop. Further, in one implementation, the system 102 may itself be a distributed or centralized network system in which different computing devices may host one or more of the hardware or software components of the system 102. In another implementation, the various components of the system 102 may be implemented as a part of the same computing device.

The system 102 is connected to the user devices 104 over the network 106 through one or more communication links. The communication links between the system 102 and the user devices 104 are enabled through a desired form of communication, for example, via dial-up modem connections, cable links, digital subscriber lines (DSL), wireless or satellite links, or any other suitable form of communication.

The network 106 may be a wireless network, a wired network, or a combination thereof. The network 106 can also be an individual network or a collection of many such individual networks, interconnected with each other and functioning as a single large network, e.g., the Internet or an intranet. The network 106 can be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. Further, the network 106 may include network devices, such as network switches, hubs, routers, for providing a link between the system 102 and the user devices 104. The network devices within the network 106 may interact with the system 102 and the user devices 104 through the communication links.

In one embodiment, the system 102 is associated with speech corpora 108, which stores samples of Oriyan English speech from different geographic regions. Although the speech corpora 108 is illustrated external to the system 102, it will be understood that the speech corpora 108 may be internal to the system 102 as well. Further, the speech corpora 108 can be implemented as, for example, a single repository, a distributed repository or a collection of distributed repositories.

In an implementation, to develop the speech corpora 108, different speech samples may be taken from different geographic locations. Such speech samples may represent different styles and accents of Oriyan English. In one implementation, the accent of the Oriyan English may depend upon the demographic region of sample gathering, sex and age of the person, and the nature of mother tongue influence. It would be understood by those skilled in the art that the data may be collected from various sources to make the speech corpus more effective, such as the Oriya English speech sounds of both vowels and consonants are explored and analyzed by taking large samples from different parts of Indian State Orissa including all demographic categories.

The system 102, according to an implementation of the present subject matter, may determine values of speech parameters for the Oriyan English speech samples of the speech corpora 108. Further, based on the parameters, governing language rules may be implemented on the speech corpora 108 for identification of accented vowels and consonant pronunciation. As described before, the governing language rules may define the rules for identification of different consonants and vowels in Oriya English. For the purpose of speech recognition and speech synthesis based on the speech corpora 108, the system 102 includes one or more processor(s) 109, interfaces 110, and a memory 112 coupled to the processor(s) 109. The processor(s) 109 may be implemented as one or more microprocessors, microcomputers, microcontrollers, digital signal processors, central processing units, state machines, logic circuitries, and/or any devices that manipulate signals based on operational instructions. Among other capabilities, the processor(s) 109 are configured to fetch and execute computer-readable instructions and data stored in the memory 112.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and/or custom, may also be included.

The interface(s) 110 may include a variety of software and hardware interfaces, for example, interface for peripheral device(s), such as a keyboard, a mouse, a microphone, an external memory, a speaker, and a printer. Further, the interface(s) 110 may enable the system 102 to communicate over the network 106, and may include one or more ports for connecting the system 102 with other computing devices, such as web servers and external databases. The interface(s) 110 may facilitate multiple communications within a wide variety of protocols and networks, such as a network, including wired networks, e.g., LAN, cable, etc., and wireless networks, e.g., WLAN, cellular, satellite, etc.

The memory 112 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 112 also includes modules 114 and data 116.

The modules 114 include routines, programs, objects, components, data structures, etc., which perform particular tasks or implement particular abstract data types. The modules 114 further include a data analysis module 118, a communication module 120, data processing module 122 and other modules 124. The other modules 122 may include programs or coded instructions that supplement applications and functions on the system 102, for example, programs in the operating system.

The data 116, amongst other things, serves as a repository for storing data processed, received, and generated by one or more of the modules 114. The data 116 includes parameter data 126, rule data 128, and other data 130. The other data 128 may include data generated as a result of the execution of one or more modules in the other modules 124.

Although, the rule data 126 has been illustrated internal to the system 102; however, it will be understood that the parameter data 126 may be hosted on external memory device(s) or external computing device(s) communicatively connected to the system 102.

As described before, the speech corpus 108 may include speech samples for different Oriyan English speech sounds including both vowels and consonants. The different speech samples of such vowels and consonants may be analyzed. In one implementation, the data analysis module 118 is configured to analyse the speech samples of the speech corpora. The data analysis module 118 may determine values of speech parameters for the speech samples based on Fujisaki Model. In said implementation, the data analysis module 118 may implement the Fujisaki model to derive excitation and spectral parameters. The excitation and spectral parameters may include base frequency of the sample, phrase component in the sample, and an associated accent component.

In another implementation, the data analysis module 118 may also identify the phonetic variation, accent, and prosody between the Oriya English and accent neutral British/American English based on the speech parameters. For this purpose, the data analysis module 118 may analyze the speech samples of the speech corpora 108 in Oriyan English along with the speech samples in accent neutral English. Further, it would be appreciated by those skilled in the art that the speech samples for analysis in both the accented English and the accent neutral English correspond to identical English text with equivalent vowel and consonant combination. In said implementation, the data analysis module 118 may analyze the speech samples based on parameters such as waveform, spectrogram, pitch, intensity and MFCC to determine the phonetic variation and prosody.

The data analysis module 118 may derive the $F_0$ frequency of the Formant contour through the Fujisaki model and analyze the Oriya English speech samples based on the speech parameters, such as the base frequency of the speech sample, phrase component in the speech sample, and an associated accent component with the speech signal. The data analysis module 118 may store the parameter values in the parameter data 126. Based on the Fujisaki model, determination of the fundamental frequency $F_0$ variation may be done where the $F_0$ contour represents a superposition of two signals, such as baseline component and accent component. To this end, the data processing module 122 may process the speech samples by filtering the samples through different linear filters implementing Fujisaki model by the data processing module 122. In one implementation, some of the filters may provide for modeling of the baseline component that accounts for speaker declination, while the other filters may provide for modeling of the micro-prosodic variations and account for the accent components.

For example, the word 'Water' may be analyzed and processed by the data analysis module 118 and the data processing module 122 in the two different Oriyan English accent and the British accent. The word 'Water' pronounced by an accent neutral British male person may be analyzed along with the word 'Water' pronounced by an Oriyan English speaking male. For both the speech samples, the data processing module 122 may determine the waveform, spectrogram, pitch, intensity, MFCC, and the speech Formant contour through the Fujisaki model.

In one implementation, the variation in the two Formant contours may be determined by the data processing module 122. The data processing module 122 in said implementation may consider mean values of the Formant contour to determine variation of the Oriya English from the British English. In one example, if the mean of the $F_0$ contour of British English Accent is determined to be 791.945506644981 Hertz (Hz) and the mean of $F_0$ contour of Oriya English is determined to be 840.2835314946623 Hz, the data analysis module 118 may determine that the Oriya English accent variation to be 48.338 Hz from the British English accent.

Similarly, the data analysis module 118 may perform the analysis for the entire speech corpora 108 comprising of phonetic variations and accent of the Oriya English against the accent neutral British/US English for a non-restrictive determination of different possible sounds and accents of each vowel and consonant. In one implementation, the determined variations may be stored in the parameter data 126 of the data 116.

In another implementation of the present subject matter, the communication module 120 of the system 102 is configured to receive speech sample from users in Oriya English. The communication module 120 may receive such speech samples through the user devices 104 via the interface 110. In said implementation, the user through the user devices 104 may provide the speech sample in Oriya English to the system 102 for processing. It would be understood that the speech sample may be received for speech recognition and speech to text conversion. Further, the speech sample may also be received for speech synthesis from the input speech where upon speech to text conversion, accented speech with Oriyan English prosody may be produced.

The system 102 may also include governing language rules for speech recognition and speech synthesis based on the speech parameters derived through the Fujisaki Model. The language rules may enable speech recognition by ascertaining the speech sample in the Oriyan English and determining the actual English consonants and vowels variations. For example, if it us determined that the $F_0$ contour for the word "Water" differs by 48.338 Hz, a language rule may specify that any variation in the $F_0$ contour by 48.338 Hz of the Oriya English may correspond to the word "Water". It would be appreciated that pronunciation of words other than "Water" may also have a $F_0$ contour variation of 48.338 Hz. In such situations, an accurate and more precise determination may be made by the data processing module 122 based on other parameters, such as waveform, spectrogram, pitch, intensity and MFCC.

For example, the speech corpora 108 may include the utterance of a sentence: "The black lazy frog was running behind the clever fox, which was in the way to hotel." Based on the utterance of this sentence in Oriya English and accent neutral British/US English and associated speech parameters, articulation of language rules for identification of accented vowels and consonant pronunciation may be done by the data processing module 122. It would be understood that the utterance of the above described sentence would differ for an Oriyan person when compared to a British person.

Particularly, the stress on syllable and morphemes might be different for different consonants and vowels. In Oriya language, generally many words have two or more syllables but only one morpheme and vice versa which differs from English language. To identify the above sentence uttered by an Oriyan person, the data processing module 122 may compare the morphemes of Oriyan English with the basic morphemes of Odia language and in situation of a positive result, may also conclude that the language is uttered in Odia accent.

In the above specified case, the sentence is, "The black lazy frog was running behind the clever fox, which was in the way to Ranbaxy hotel." The utterance of the part of this sentence i.e., "The black lazy" in British English accent is, "ð i blæk 'leizi" but the sentence's utterance in Oriya accent may be, "Thee blaak lezzi". Therefore, the data processing module 122 may implement the language rules based on speech parameters to identify utterance of syllables and morphemes. In one implementation, the language rules may be implemented according to the Table 1 to differentiate utterances in both British English and Oriya English:

| COMBINATIONS | WORDS | BRITISH ACCENT | Oriya influenced ACCENT |
| --- | --- | --- | --- |
| VOWEL-VOWEL | Aero | èɔɔu | ero |
| VOWEL-CONSONANT | Ugly | ˏˆgli | agli |
| CONSONANT-VOWEL | Cap | kæp | Kyap |
| CONSONANT-CONSONANT | Tsu-nami | Tsu:'na:mi | sunaami |
| VOWEL-NASAL | Engineer | endginiə(r) | Inginiar |
| NASAL-VOWEL | Name | neim | Nem |
| CONSONANT-NASAL | CNN | Si: en èn | Si en en |
| NASAL-CONSONANT | MP | Em 'pi: | em pi |

In another implementation, such language rules may be based on the Hidden Markov Model (HMM). It would be understood by those skilled in the art that the HMM is used for speech to text conversion which is a statistical model used for this purpose. For the purpose of speech to text conversion of Oriya English, the data processing module 122 of the system 102 may utilize geometrically averaged output probability likehood method and centralized parametric spaced method of the HMM. The geometrically averaged output probability likehood method is based on the duration of speech sample as it considers the duration's influence on the corresponding output probability, without certain regularity. Similarly, the centralized parametric spaced method may be realized during each iteration by computing new parameters of HMM based on every speech sample independently.

The system 102 may also synthesize speech from English text. The synthesized speech may be based on the phonetic variations of Oriya English and may include prosody of Oriyan English. In one implementation, the data processing module 122 may process the English text to synthesize speech based on HMM. The HMM for speech synthesis may utilize the Festival architecture of speech synthesis. The data processing module 122 may utilize a Hidden Markov Toolkit for Speech Synthesis (HTS) based on the speech excitation parameters and the speech spectral parameters. The utilization of the speech parameters may allow induction of the prosody and phonetic variations of the Oriya English to generate natural speech for Oriyan people. It would be appreciated that the prosody and phonetic variation present in the Oriya English speech has already been determined by the system 102 and stored in the parameter data 126 based on HMM during analysis of the speech samples of the speech corpora 108. Since the process of speech synthesis through the HMM would be understood by those skilled in the art, detail explanation of the same has been omitted for the sake of brevity.

In one implementation, the described systems may be implemented in different speech recognition industries and voice user interfaces, such as business process outsourcing industry, medical diagnostic centers, speech analysis institutes, banking sectors, medical facilities, and support for challenged individuals. Further, the described systems may also be implemented in different applications, such as interactive voice response (IVR) systems, automated identifications, speech to text translations, and telephony systems for speech recognition and synthesis.

In such implementations, it would be understood by those skilled in the art that the user devices 104 may be used by different individuals to provide speech input in Oriya English that may be processed by the system 102 for recognition and further synthesis.

Figure 2A:
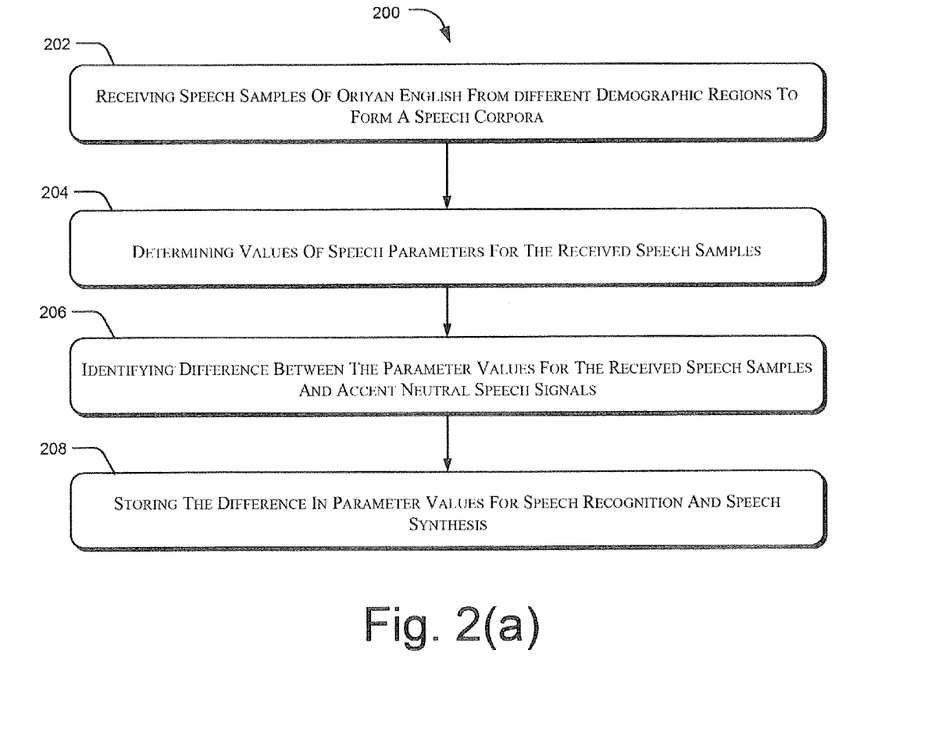
FIG. 2(a) illustrates a method to develop a speech corpora for Oriya English, in accordance with an embodiment of the present subject matter.
Figure 2B:
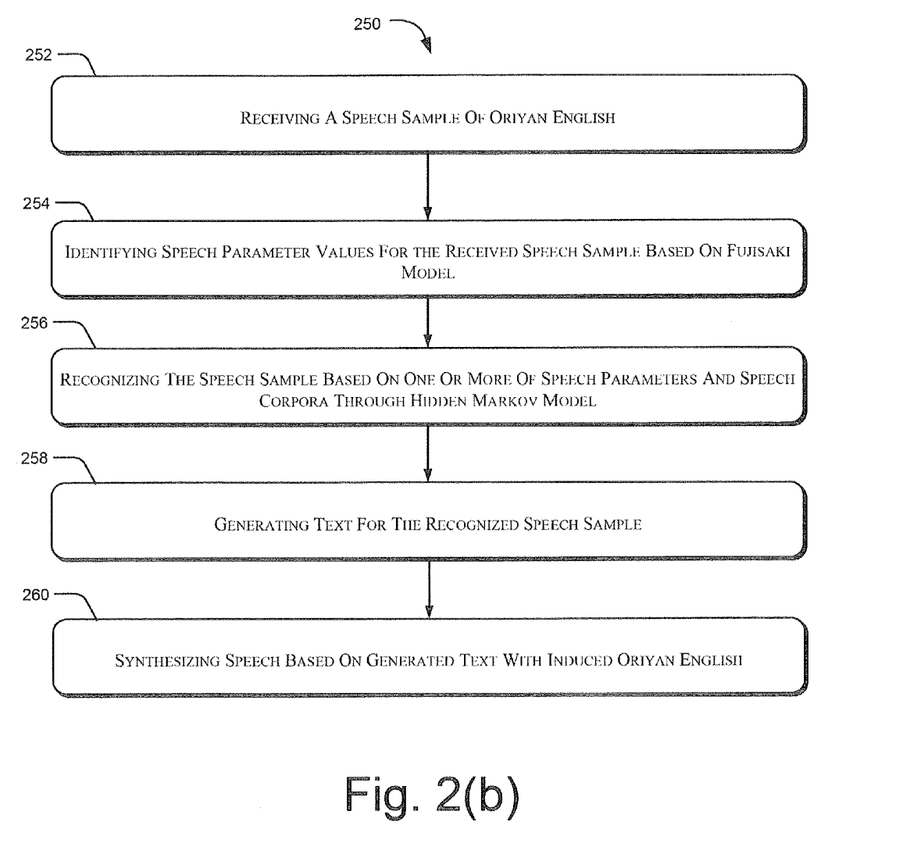
FIG. 2(b) illustrates a method for speech processing for second language speech, in accordance with an embodiment of the present subject matter.

FIGS. 2(a) and 2(b) illustrates methods 200 and 250 for speech processing including speech recognition and speech synthesis of a second language speech, in accordance with an embodiment of the present subject matter. According to an aspect, the concepts of speech processing of a second language speech are described with reference to the system 102 described above.

The method(s) may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

The order in which the method is described is not intended to be construed as a limitation, and any number of the described method blocks can be combined in any order to implement the method 200 and 250, or an alternative method. Additionally, individual blocks may be deleted from the methods without departing from the spirit and scope of the subject matter described herein. Furthermore, the methods 200 and 250 can be implemented in any suitable hardware, software, firmware, or combination thereof. The methods 200 and 250 is explained with reference to the system 102, however, it will be understood that the methods can be implemented in other systems as well.

Referring to method 200, at block 202 speech samples of Oriyan English is received from different geographic regions to form a speech corpora. In one implementation of the present subject matter, for speech processing the speech corpora may include speech samples from different age groups and different sex of people. For example, a word "Water" may be received from an Oriyan male as well as from an Oriyan female. Further, the same word may be received from an Oriyan elderly as well as an Oriyan kid. The variations in ages and sex may allow the speech corpora to have nearly an exhaustive collection of pronunciations of English vowels and consonants in Oriya English.

At block 204, values of speech parameters for the received speech samples may be determined. In one implementation, the speech parameters may include different excitation parameters and spectral parameters of the Oriyan English. The speech parameters may also enable articulation of governing language rules for speech recognition and speech synthesis.

At block 206, difference between the parameter values for the received speech samples and accent neutral speech samples is identified. Different Oriya English speech samples received include different features based on the degree of mother tongue influence and the person from whom the sample was collected. In one implementation, the speech samples of the Oriya English are compared with the speech samples of accent neutral British/US English to determine the differences. The difference may be based on the speech parameters, such as the Formant contour of the sample, the waveform, spectrogram, pitch, intensity, and MFCC. The differences may provide the phonetic variations and accent influence of Oriya English for different vowels and consonants which may further be stored (at block 208).

Referring to FIG. 2(*b*), at block 252, a speech sample of Oriya English may be received. The speech sample may include phonetic variations and accent of Oriya English due to mother tongue influence that may cause the inflection in pronunciation when compared to an accent neutral British/US English.

At block 254, speech parameter values for the received speech sample may be determined based on Fujisaki Model. The Fuzisaki model may allow determination of Formant contour of the speech sample that may provide the phonetic variation and the degree of mother tongue influence in the Oriya English when compared to accent neutral British/US English. Further, the speech parameter values may also allow identification of the consonant and vowels associated with the speech sample.

In one implementation, the determination of the associated consonant and vowels may be implemented through Hidden Markov Model (HMM) at block 256. The HMM may allow speech to text conversion based on the identified parameter values. In one implementation, based on the recognized speech sample, a text may be generated for the speech sample at block 258.

At block 260, speech may be synthesized based on the generated text where the speech has induced prosody of Oriya English. In one implementation, the parameters identified for different speech samples of the speech corpora are utilized to induce the accent and phonetic variation in the generated speech. In said implementation, Hidden Markov toolkit for Speech synthesis (HTS) may be utilized to generate the speech sample.

Although embodiments for methods and systems for speech processing of second language speech have been described in a language specific to structural features and/or methods, it is to be understood that the invention is not necessarily limited to the specific features or methods described. Rather, the specific features and methods are disclosed as exemplary embodiments for speech recognition.

I claim:

1. A computer implemented method of speech processing of second language speech, the method comprising:
    receiving a plurality of speech samples of Oriya English to form a speech corpora, wherein a plurality of speech parameters are associated with each of the plurality of speech samples, each of the plurality of speech parameters being indicative of properties associated with the speech samples; and wherein the plurality of speech samples comprise sounds corresponding to both vowels and consonants;
    determining values of the plurality of speech parameters for each of the plurality of speech samples based on Fujisaki model, wherein the values of the plurality of speech parameters comprises base frequencies of each of the speech samples, phrase components of the speech samples, and associated accent components with the speech samples, wherein each of the speech samples are processed by filtering each of the speech samples using different linear filters, and wherein the linear filters model a baseline component which corresponds to speaker declination and model a micro-prosodic variations which corresponds to the accent components of each of the speech samples;
    identifying difference between the values of each of the plurality of speech parameters and a corresponding value of accent neutral English based on Formant contour of the sample, the waveform, spectrogram, pitch, intensity, and Mel Frequency Cepstral coefficient (MFCC); and
    articulating governing language rules based on the identifying, wherein the governing language rules enable assessment of phonetic variation, accent, prosody and mother tongue influence in sounds of vowels and consonants of Oriya English for speech processing.

2. The method as claimed in claim 1, wherein the determining of the values of the plurality of speech parameters is based on Fujisaki Model, and wherein a Formant contour (FO) is determined for the plurality of speech samples.

3. The method as claimed in claim 1, wherein the plurality of speech parameters comprises excitation parameters and spectral parameters.

4. The method as claimed in claim 1, wherein the plurality of speech samples is received from one or more of people of different sex and age group, and from different demographic regions.

5. The method as claimed in claim 1, the method further comprising:
    receiving a speech sample in Oriya English for speech processing;
    determining values of each of the speech parameters for the received speech sample based on Fujisaki Model; and
    recognizing the speech sample based on one or more of the speech parameter values and an Oriya English speech corpora through Hidden Markov Model (HMM).

6. The method as claimed in claim 5, wherein the method further comprises generating text in accordance with the recognized speech sample, wherein the text is independent of phonetic variations and mother tongue influence of Oriya English.

7. The method as claimed in claim 5, wherein the method further comprises synthesizing natural speech, wherein the synthesized natural speech is induced with Oriya English accent based on the phonetic variations of Oriya English determined based on the values of each of the speech parameters.

8. The method as claimed in claim 1, wherein the recognizing is based on one or more of geometrically averaged output probability likelihood method and centralized parametric spaced method of HMM.

9. A speech processing system comprising:
a processor; and
a memory coupled to the processor, the memory comprising:
- a communication module configured to receive speech sample in Oriya English for speech recognition;
- a data analysis module configured to: determine values of a plurality of speech parameters for the received sample based on Fujisaki model, wherein the values of the plurality of speech parameters comprises base frequencies of the speech samples, phrase components of the speech samples, and associated accent components with the speech samples, wherein each of the speech samples are processed by filtering each of the speech samples using different linear filters, and wherein the linear filters model a baseline component which corresponds to speaker declination and model a micro-prosodic variations which corresponds to the accent components of each of the speech samples; and
- a data processing module configured to recognize the speech sample based on governing language rules through Hidden Markov Model (HMM).

10. The speech processing system as claimed in claim 9, wherein the data processing module is further configured to:
generate text in accordance with the recognized speech sample, wherein the text is independent of Oriya English phonetic variations and mother tongue influence; and
synthesize natural speech based on the generated text, wherein the synthesized natural speech is induced with Oriya English accent based on the phonetic variations of Oriya English determined through the speech parameters.

11. The speech processing system as claimed in claim 9, wherein the recognizing of the speech sample is based on one or more of geometrically averaged output probability likelihood method and centralized parametric spaced method of HMM.

12. The speech processing system as claimed in claim 9, wherein the speech parameters comprise excitation parameters and spectral parameters.

13. The speech processing system as claimed in claim 9, wherein the data processing module is further configured to determine one or more of waveform, spectrogram, pitch, intensity and Mel Frequency Cepstral coefficient (MFCC) of the received speech sample.

14. The speech processing system as claimed in claim 9, wherein the data analysis module is further configured to determine a formant contour (FO) associated with the received speech sample based on the Fujisaki Model.

15. A non-transitory computer readable medium having a set of computer readable instructions that, when executed, cause a computing system to:
receive a speech sample in Oriya English for speech processing;
determine values of each of the speech parameters for the received speech sample based on Fujisaki Model, wherein the values of the plurality of speech parameters comprises base frequencies of the speech samples, phrase components of the speech samples, and associated accent components with the speech samples, wherein each of the speech samples are processed by filtering each of the speech samples using different linear filters, and wherein the linear filters model a baseline component which corresponds to speaker declination and model a micro-prosodic variations which corresponds to the accent components of each of the speech samples; and
recognize the speech sample based on one or more of the speech parameter values and speech corpora through Hidden Markov Model (HMM);
generate text in accordance with the recognized speech sample, wherein the text is independent of phonetic variations and mother tongue influence of Oriya English; and
synthesize natural speech, wherein the synthesized natural speech is induced with Oriya English accent based on the phonetic variations of Oriya English determined through the speech parameters.

* * * * *